US008425646B2

(12) United States Patent
Gorozidis

(10) Patent No.: US 8,425,646 B2
(45) Date of Patent: Apr. 23, 2013

(54) FILTER FOR HIGH PRESSURE DEVICE

(76) Inventor: Simon Gorozidis, Dandenong (AU)

( * ) Notice: Subject to any disclaimer, the term of this patent is extended or adjusted under 35 U.S.C. 154(b) by 339 days.

(21) Appl. No.: 12/653,828

(22) Filed: Dec. 18, 2009

(65) Prior Publication Data

US 2011/0078986 A1 Apr. 7, 2011

(51) Int. Cl.
*B01D 46/00* (2006.01)

(52) U.S. Cl.
USPC ............................ 55/503; 55/505; 55/DIG. 17

(58) Field of Classification Search .................... 55/503, 55/505, 507, DIG. 17
See application file for complete search history.

(56) References Cited

U.S. PATENT DOCUMENTS 4,256,474 A * 3/1981 Berger et al. .................. 96/152

* cited by examiner

*Primary Examiner* — Robert A Hopkins
(74) *Attorney, Agent, or Firm* — Christensen O'Connor Johnson Kindness PLLC

(57) ABSTRACT

A filter device for substantially minimizing moisture and particulate matter in a stream of compressed air or other fluid.

26 Claims, 3 Drawing Sheets

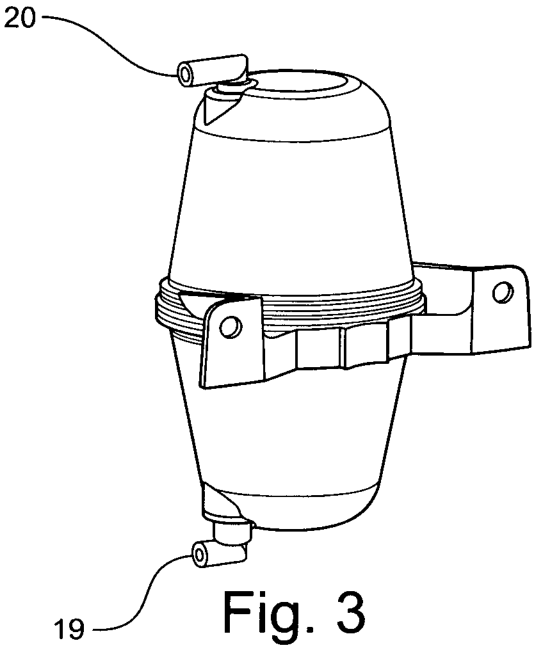
Fig. 3
Fig. 4
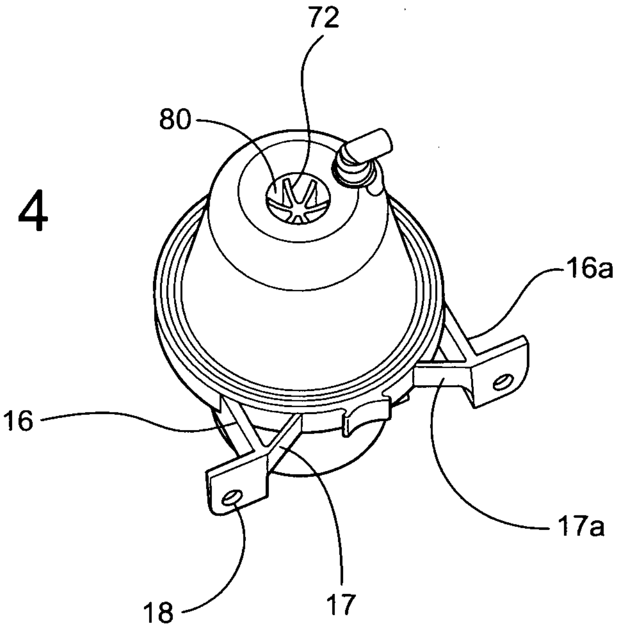

FILTER FOR HIGH PRESSURE DEVICE

This application claims priority based upon previously filed Australian Patent Application No. 2009222622 filed on 7 Oct. 2009, the contents of which are hereby incorporated by reference.

FIELD OF THE INVENTION

The present invention relates to a filter for separating moisture and particulate matter from a stream of high pressure air/fluid. In particular the present invention relates to an air filter for a spray painting assembly, which substantially removes liquid and particulate matter from a stream of compressed air.

BACKGROUND OF INVENTION

Spray painting is a painting technique where a device sprays a liquid coating substance such as paint, ink, or varnish through the air onto a surface. Typically paint is changed into a mist or aerosol, in order to apply a coating onto an object or surface.

Most spray painting is performed with the use of a spray gun. A spray gun combines the coating (paint) and compressed air from a separate air compressor in order to atomize the coating and direct it to the target surface. The coating is held either in a small bottle or container attached to the spray gun or in a separate pressurised container attached to the spray gun with a hose. In a conventional paint-spray gun, the handle of the gun has a tube directly connected with an air compressor to supply pressurized air. The tube is used as a Venturi tube so as to have a paint sprayed on to an object.

It is known that in the production of compressed air, air is drawn from the atmosphere and compressed by a suitable compressor, such as a reciprocating piston, screw type, sliding vane type, centrifugal type, or axially staged blades. The compressed air, however, contains supersaturated water vapour, which condenses upon cooling. If water is not removed from a spray-painting system, there is a tendency for the air passages to become blocked with water. This water can reach the mechanical drive components of the air tools, which prevent their operation and may be very expensive to repair.

Further, in practice it is found that during spraying, the compressor motor gets hot and water vapour in the compressed air condenses into the compressed air tank. Subsequently a stream of compressed air may transport condensed liquid into the paint gun or point of use application. This may result in ‘spitting’ of moisture at the point of application wherein the moisture becomes embedded in the paint work.

Since the moisture and the paint are unable to become a compound, the moisture is usually coated on the surface of an object, and the moisture is covered by the paint sprayed; as a result, the surface sprayed with paint would have moisture spots. The presence of moisture is also known to affect the resultant colour of a paint applied. A blemished pain work cannot be rectified by simply painting over the blemished work.

During the painting process, orange peel, fisheyes, blistering, running, and other imperfections in the coating can be cause for rejection and may result in scrapping the body part. Metal flakes in the paint must be oriented parallel to the body surface to increase reflectivity. The consequences of paint surfaces which do not meet the required minimum standards is very costly. The overall quality of the paint on a vehicle for example can play a major role in selection of a car for purchase.

The overall costs associated with painting are very large. Failure to achieve the required quality and luminosity in the paint surface adds greatly to the overall cost.

The automobile industry needs a solution to the spray problem. A great deal of effort and expense is invested in painting, much of which is wasted. It is absolutely essential, therefore, that as much of the moisture as possible be removed from the compressed air before it is supplied to the devices utilizing this air.

There are several known prior art devices, which seek to avoid the above-enumerated problems. All of these prior art devices accumulate a measured amount of liquid before releasing the accumulated fluid from the compressed air. These devices expel accumulated condensate fluid separated from the compressed air by a float mechanism or by sensitivity to fluid pressure differential which is proportional to the amount of condensate fluid trapped. However, water condensate devices utilizing the aforementioned mechanism are not reliable since the pressure differential mechanisms are subject to clogging and the float mechanisms are subject to seizing. Thus, the aforementioned mechanisms fail to open or, if they open, they fail to close again because of dirt or moisture interfering with the operation of the mechanism.

In another spray painting system currently in use, a filter device consisting of a modified tissue roll is provided within a housing, which device is mounted between a compressor and a spray gun. This type of filter device appears to be an adaptation of an oil filter device described in any one of U.S. Pat. Nos. 2,661,846; 3,317,045; and 3,487,942.

In U.S. Pat. No. 3,317,045 for example, an oil filter device is envisaged utilizing a conventional toilet roll as a filter medium to minimise cost of replacement of an oil filter cartridge, which is both expensive and recommended to be replaced as often as engine oil is changed. In commercial spay painting systems, adaptation of such devices as a means of preventing passage of moisture from a compressor through to the paint reservoir has been attempted and proved to be ineffective, and generally results in total disintergration of the toilet paper roll.

In order to overcome the above problems with the use of a conventional toilet roll, the filter device uses a manufactured filter cartridge to improve resistance to disintergration by a stream of compressed air. The manufactured filter cartridge consists of an impervious plastic core and wound outer roll of compressed paper material. It is found however that the moisture filter function of the manufactured filter cartridge fails after several uses because air/fluid flow results in formation of channels in the filter cartridge hence only the impurities filtering function is workable.

In order to address the adverse effect of channel formation in the manufactured filter cartridge product, it is recommended that the cartridge product be replaced at least once a week at a cost of about $30.00 per cartridge. Such frequent replacement of the cartridge with a refill cartridge represents a very substantial cost relative to the cost of the filter device. Further improvement of filtering devices in the spray painting industry is therefore required to improve efficiency and reduce costs.

Another filter device recently available on the market includes a replaceable dessicant cartridge mounted within a housing. As with the prior art discussed above, the problem with this type of system is that the cartridge is very expensive and requires regular replacement in order to maintain optimum filtering efficiency.

It is to be understood that any discussion of prior art heretofor is not an admission that such art constitutes an acknowledgement of common general knowledge.

It is therefore an object of the present invention to address one or more of the disadvantages of the prior art.

It is a further object to provide a filter system which can provide the public with a useful alternative, which is cost effective and uses conventional toilet paper.

SUMMARY OF THE INVENTION

In accordance with the invention there is provided a filter device for substantially minimising moisture and particulate matter in a stream of compressed air or other fluid including:

a substantially symmetrical housing comprising at least two interconnectable frusto-conical body elements, the housing having:

- an inlet end connectable to a compressed air source and an opposite outlet end for egress of filtered air, the housing including an internal chamber for the passage of compressed air/fluid between the inlet and outlet, and
- a mounting structure at end portions of the frusto-conical body element, the mounting structures being centrally located of the chamber;

a paper filter medium selected from one or more of a conventional toilet roll or the like paper roll having a cylindrical open-ended paper/cardboard core, wherein in an operating condition, the ends of the cylindrical core of the paper filter are received on at least a portion of the mounting structures, wherein the cylindrical core and mounting structures form a continuous column structure centrally of the chamber, wherein a circumferential gap is provided between at least the inlet end of the housing and the paper filter medium to initiate circuitous movement of incoming pressurised air/fluid stream about the mounting structure; and a locking means that releasably interlocks the frusto-conical body elements in a substantially air/fluid tight operating condition;

wherein in an operating condition, air/fluid, which is directed into the chamber under pressure through the inlet, is urged in a circuitous air/fluid filter pathway around the column structure and through the paper filter medium towards the outlet substantially increasing moisture filter efficiency and whereby particulate matter becomes trapped in the filter medium or falls under gravity as the air/fluid stream progresses towards the outlet.

The present invention provides an advance in filtering efficiency over the prior art devices because it provides a circuitous/cyclonic fluid path over a linear distance between the inlet and outlet such that there is provided greater surface area contact with the filter medium while minimising channel formation. The increased filter pathway also effectively increases the tear resistance of the paper filter roll and therefore the tendency of the filter roll to disintegrate as in the prior art.

The locking means can include complementary mating components that engage with the frusto-conical bodies to substantially maintain the body elements in an air/fluid tight condition during operation of the device. The mating components can include screw threaded sections on each frusto-conical body.

The filter device can further include a releasable holding means mountable over the housing for holding the frusto-conical body elements together in a fluid/air tight condition during operation.

The releasable holding means can include a locking system which assists to maintain the relative positions of the body elements to provide an air/fluid tight housing. The locking system can consist of interlocking components that engage with the pair of bodies.

The holding means can include a ring member mountable over the housing wherein at least a portion of the body elements and the ring member have complementary engagement means allowing engagement which causes the ring member to hold the bodies together in a air/fluid tight condition.

In a related aspect there is provided a filter device for substantially minimising moisture and particulate matter in a stream of compressed air or other fluid including:

a housing comprising a first and second body elements, each of the first and second body elements having a closed collar and an open waistband interconnected by a wall, the waistband of each body element having complementary mating components that releasably engage the first and second body elements to form a substantially air/fluid tight internal chamber the first and second body elements include a mounting structure extending from a portion of the respective collar and being centrally located of the chamber;

a first of the body elements including an inlet located in a portion of the collar adjacent the mounting structure for ingress of air/fluid from a air/fluid source into the chamber, and the second of said body elements including an outlet located in a portion of the respective collar adjacent the respective mounting structure for egress of air/fluid from the chamber;

a paper filter medium mounted within the internal chamber, the paper medium selected from one or more of a conventional toilet roll or the like paper roll having a cylindrical open-ended paper/cardboard core, wherein the ends of the cylindrical core of the paper filter are received on at least a portion of the respective mounting structures, the cylindrical core and mounting structures forming a continuous column structure centrally of the chamber, and wherein a circumferential gap is provided between the inlet and the paper filter medium to initiate movement of incoming pressurised air/fluid stream about the mounting structure; and wherein in an operating condition, air/fluid, which is directed into the chamber under pressure through the inlet, follows a tortuous air/fluid filter pathway around the column structure and through the paper filter medium towards the outlet substantially increasing moisture filter efficiency and whereby particulate matter becomes trapped in the filter medium or falls under gravity as the air/fluid stream progresses towards the outlet.

The present invention is capable of using conventional toilet paper as the filter medium with improved filtering efficiency and greater economic benefit, i.e., there is now less of a need to use purpose manufactured filter mediums, which is characteristically expensive to replace on a regular basis.

In one embodiment of the present invention two conventional toilet paper rolls are used as the filter medium within the chamber, wherein a first roll is received within one of the first or second body elements such that a portion of the roll protrudes beyond the waistband, and the second roll is received within the second body element such that a portion of the roll protrudes above the waistband, wherein when the waistband of the first and second body elements are joined to form the housing the protruding portions of the two rolls undergo compression whereby a portion of the rolls is urged against the wall of the respective bodies and wherein a shallow v-shaped gap in cross-section is formed between the walls of the body elements and the paper rolls so as to deflect air/fluid away from the walls and propagate cyclonic air/fluid pathway about the column structure.

The mounting structures can be centrally located of respective collars and interconnected thereto by a series of spaced apart radial ribs. Each of the radial ribs can include a flat portion therealong which in combination form an annular platform for resting a surface of the filter paper medium. The ribs can also include a series of spaced concentric recesses so that a circumferential gap is available between the paper medium and the inlet to urge circular movement of incoming air/fluid stream.

The device can further include a releasable holding means mountable over the waistband of the body elements for holding the body elements together in a fluid/air tight condition during operation.

The releasable holding means can include a locking system which assists to maintain the relative positions of the body elements to provide an air/fluid tight housing. The locking system can consist of interlocking components that engage with the pair of bodies.

The holding means can include a ring member mountable over the waistband of the bodies wherein at least a portion of the waistband of the bodies and the ring member have complementary engagement means allowing engagement which causes the ring member to hold the bodies together in a air/fluid tight condition.

The collar of each body can include an external recess for receiving interlocking ends of a fitted safety belt. The safety belt helps to maintain the bodies together in the event of inadvertent separation of the bodies during operation. The safety belt can be a looped structure of material including integral locking elements, the belt being adapted to be securely fitted over the longitudinal length of the housing and wherein the locking elements are received within the external recesses of the each collar in a fitted condition.

The first and second body elements can be frusto-conical shaped to assist formation of circuitous air/fluid pathway through the filter medium: The body elements can be made from plastics material.

The filter medium can include at least two rolls of conventional toilet tissue such that both body elements house a separate roll and wherein the cylindrical cores are substantially aligned and coterminous to form a longitudinal continuous column structure within the chamber with the respective mounting structures.

In a related aspect of the present invention there is disclosed a filter device for use in a spray paint system for substantially minimising moisture and particulate matter in a stream of compressed air including:

an air tight housing structure having an internal longitudinal chamber adapted to releasably receive a paper filter medium such as a conventional toilet tissue roll, the chamber being formed by joining an upper body and a lower body, the upper and lower body each having a collar forming a first and opposite ends of said housing, and a waistband about which the upper and lower bodies are releasably joined in an operating condition;

the upper and lower body include a mounting structure extending inwardly and centrally of the chamber from said ends, wherein a cylindrical core of the paper filter medium is mounted over the mounting structure at each end thereby forming a central longitudinal column structure within the chamber extending from one mounting structure to the opposite mounting structure;

the collar of the lower body having an inlet opening for receiving a stream of compressed air, the inlet being located in offset relation from the mounting structure, and the collar of the upper body having an outlet opening for egress of filtered air to a spray gun, the outlet opening being located in offset relation to the respective mounting structure;

wherein at least the mounting structure of the lower body is interconnected to the respective collar by a series of spaced apart radial ribs, the ribs providing a circumferential platform on which the paper filter is seated in spaced relation to the inlet, and wherein when the paper filter is seated on the ribs, the ribs define a series of separate compartments about the mounting structure;

wherein the compartments are in air/fluid communication about the mounting structure such that compressed air entering the inlet port is directed to flow circumferentially about the mounting structure and between the compartments, and thereafter through the filter medium and about the column structure so as to increase the air path such that moisture from the compressed air is substantially removed without substantially destroying the paper medium.

The filter device can include a releasable holding means mountable on or over the waistband portions of the upper and lower bodies to help maintain the upper and lower bodies of the housing in an air tight condition. The releasable holding means can include a locking system wherein at least a portion of the waistband of the bodies and the holding means comprise complementary mating components that releasably join/engage the upper and lower bodies.

The upper and lower body elements can be frusto-conical shaped to assist formation of circuitous air/fluid pathway through the filter medium. It has been found that the shape of the body elements promotes the formation of a shallow v-shaped gap (in cross-section) formed between the walls of the body elements and the paper rolls when the paper rolls have been located over the mounting structures and the upper and lower bodies joined so as to compress the roll(s).

Without wishing to be bound by any theory it is believed that the shape of the housing of the present invention in combination with the air/fluid gap provided between the toilet paper and air/fluid inlet, provides a means by which an air or fluid stream under pressure entering the housing traverses a cyclonic air flow path about the central structure. As such the air path is increased, there is minimal contact between the air/fluid stream and the paper roll core and concentration of the incoming air/fluid stream is deflected over a wider surface area thereby substantially minimising the effect of disintergration observed in the prior art devices.

The housing can include two conventional toilet paper rolls within the chamber, wherein a first roll is received within the upper body such that a portion of the roll protrudes beyond the waistband, and the second roll is received within the lower body such that a portion of the roll protrudes above the waistband, wherein when the waistband of the upper and lower body are joined to form the housing the protruding portions of the two rolls undergo compression whereby a portion of the rolls is urged against the wall of the respective bodies and wherein a shallow v-shaped gap in cross-section is formed about the waistband so as to deflect air/fluid away from the wall and urge cyclonic air/fluid pathway about the central structure.

A specific embodiment of a filter device in accordance with this invention will now be described with the aid of the accompanying drawings which are given by way of example only and should not be considered to be limiting. Following is a brief description of the drawings.

BRIEF DESCRIPTION OF THE DRAWINGS

FIG. 3: shows a perspective underneath view of a filter unit in accordance with one embodiment of the present invention;

FIG. 4: shows a perspective view from the front of the filter unit in accordance with FIG. 3;

DETAILED DESCRIPTION OF THE PREFERRED EMBODIMENTS WITH RESPECT TO THE ACCOMPANYING DRAWINGS

Figure 1:
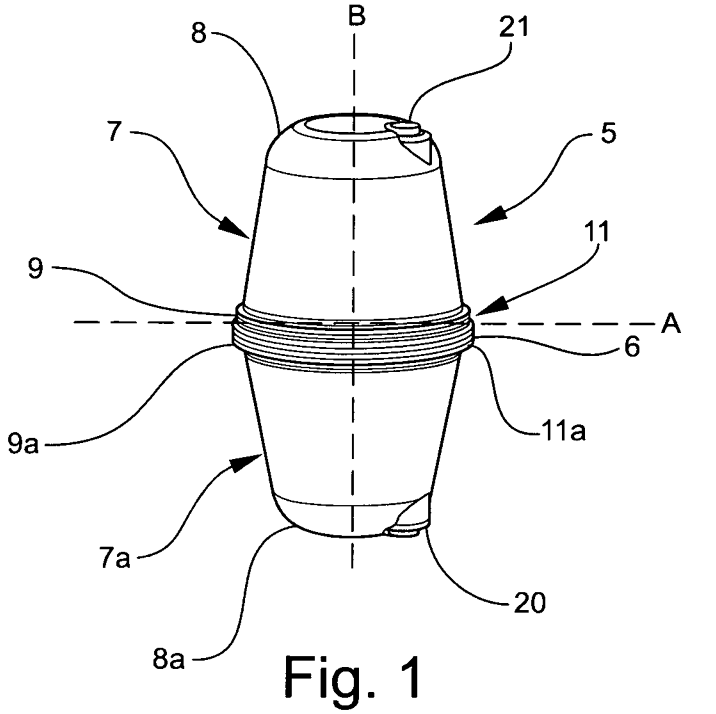
FIG. 1: shows a side perspective view of a filter body in accordance with one embodiment of the present invention.

Referring to the drawings, there is shown a filter device 5 adapted for installing between an air compressor (not shown) and a spray paint gun (not shown) to substantially remove moisture and particulate matter in a compressed air stream prior to application of paint or the like to a vehicle body or other substrate. As shown in FIG. 1 the filter device 5 includes a shaped housing 6 being substantially symmetrical about horizontal line A and vertical line B. The housing comprises an upper body element 7 and a lower body element 7*a*. The bodies are substantially frusto-conical in shape having a narrow collar end 8 and 8*a* and waistbands 9 and 9*a* interconnected by a wall structure 30, each body defining an internal chamber 22 (see FIG. 5). The collars 8 and 8*a* have closed ends apart from inlet 20 and outlet 21 located in shoulder potions of respective ends.

In FIG. 1 the upper and lower body are shown in abutment relation at their waistband. In this condition the upper and lower body can be easily disengaged to allow access to respective internal chambers.

The housing shown in FIG. 1 illustrates the waistbands 9 and 9*a* in abutting relation. In this embodiment each body includes a screw-threaded section 11 and 11*a* on wall sections of the respective body at or adjacent the waistband. When the waistbands 9 and 9*a* are disposed in an abutting relation the respective partial external screw threaded sections form a continuous threaded section on the housing about line A.

Figure 2:
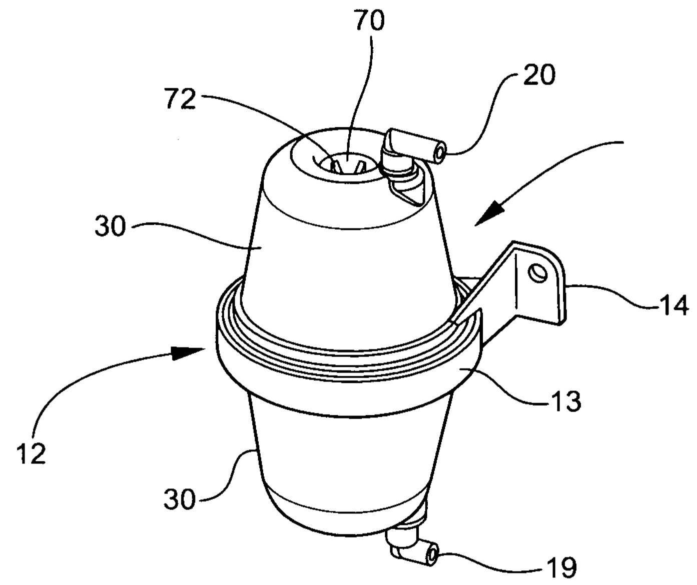
FIG. 2: shows a perspective view of an assembled filter unit in accordance with one embodiment of the present invention.

As can be seen from FIG. 2 the device includes a holding structure 12 which has an internal screw threaded section adapted to mate with the continuous threaded section on the housing. When the waistbands of the bodies abut, the threaded section and holding structure 12 cooperate to hold the bodies 7 and 7*a* together in an air tight condition for receiving and filtering a stream of compressed air at about 60 psi.

The holding member 12 includes a mounting ring 13 and support feet 14. The mounting ring includes a threaded section (not shown) which cooperates with the screw threaded section on the housing hence when the waistbands 9 and 9*a* lie in abutting relation, the ring is removably tightened over the upper and lower bodies. The mounting ring therefore releasably secures the upper and lower bodies together in an air-tight operating condition. The filter device must remain substantially air-tight throughout an operation such as spray painting in order to maintain a consistent operating pressure of about 60 psi. In order to provide a stream of air sufficient for atomising a charge of paint downstream therfrom, the operating pressure must be within a range of about 40 to about 60 psi. The filter device must therefore be capable of withstanding corresponding internal pressures.

As best seen in FIGS. 3 and 4, the feet 14 are interconnected to the mounting ring by leg members 16 and 16*a*. Further support for the feet 14 is provided by cross-members 17 and 17*a*. The feet 14 include central openings 18 to receive a screw or other fastening element for locating the filter device on a wall or bench.

Figure 6:
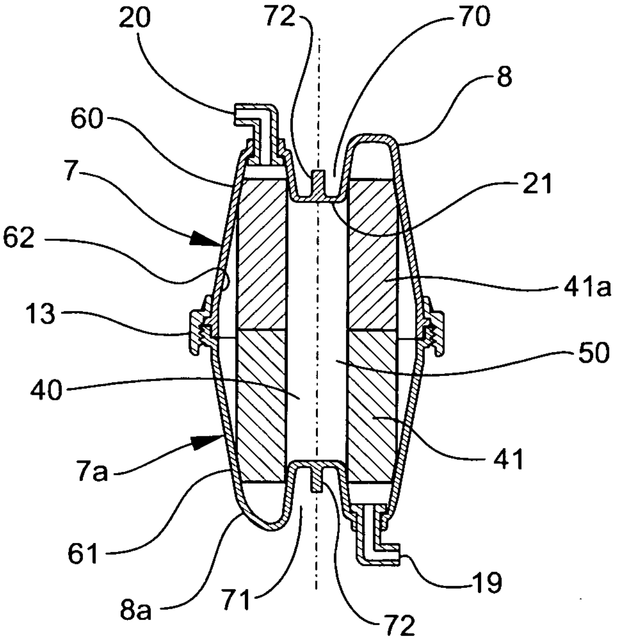
FIG. 6: shows a vertical cross sectional view of the filter unit of FIGS. 2 to 4 fully assembled.

As can be seen from FIGS. 2, 3 and 6 the lower body 7*a* includes an inlet port 19 and the upper body 7 includes an outlet port 20. In FIG. 6 the inlet port and outlet ports are diametrically disposed to increase the air pathway.

Figure 5:
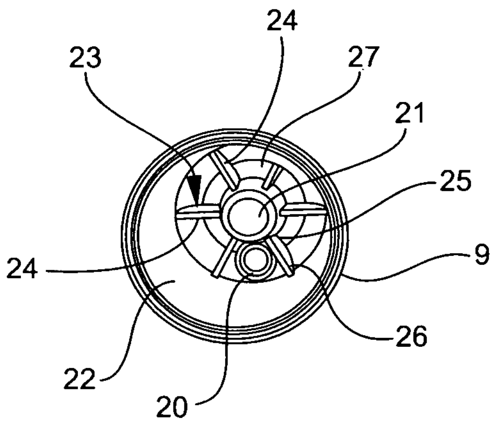
FIG. 5: shows a perspective internal view of a part of the filter unit in accordance with the present invention.

As seen in FIG. 5, the bodies 7 and 7*a* each include a mounting structure being an annular boss 21 centrally located of the chamber. The boss 21 is interconnected to the collar by a series of spaced apart radial ribs 23, which form an annular series of compartments 27 about the boss. The ribs 23 include a flat portion 24, which in combination form a platform for receiving the paper filter medium. The ribs also include spaced recesses 25 and 26 on either side of the flat portion 24, which provide concentric fluid/air communication between each compartment. The inlet port 20 is located adjacent the boss and allows entry of a stream of air/fluid into the chamber via the compartment. As air/fluid enters the compartment, the spaced recesses 25 and 26 allow flow between adjacent compartments and initiates cyclonic air flow.

Referring to FIG. 6 there is shown in vertical cross-section two rolls of a conventional toilet paper positioned within the upper and lower body of the housing. The each filter roll includes a cylindrical paper core support element 40, made from a paper material such as cardboard, about which toilet paper 41 is wound around. In this embodiment an end portion of each cylindrical core is mounted over a portion of the respective boss 21 and the paper or like material is seated on the flat portions 24. As can be seen, when the core elements 40 of the toilet rolls are mounted over the respective bosses a longitudinal cylindrical structure 50 is formed centrally of the chamber extending from collar 8 to collar 8*a*.

When the upper and lower bodies are brought into an engaged arrangement by means of the ring 13, the toiled paper rolls 41 and 41*a* are compressed such that end portions 60 and 61 of the rolls are urged positively against upper and lower wall sections of the chamber. In doing so a shallow v-shaped gap 62 is formed. In this embodiment air/fluid entering the shallow v-shaped gap is deflected off the angled wall surfaces back into the toilet paper. The shallow v-shaped gap assists air movement in a cyclonic direction around the central cylindrical structure and through the paper.

Referring to FIG. 6, in an operating condition a source of compressed air is supplied to inlet port 19 under pressure of about 60 psi from a compressed air source (not shown). Air entering the body is urged through the toilet paper rolls in a substantially circular air path around the central structure towards the outlet. The air path is thus increased and as a result not only is moisture removed in contact with the paper, the force of the incoming air stream is dispersed over a greater surface hence the toilet paper can be successfully used. This represents a substantial improvement both in terms of operation efficiency and cost.

Further, with reference to FIGS. 2, 4 and 6, the collars 8 and 8*a* include a recess 70 and 71 disposed externally and opposite the bosses 21. The recesses include a series of spaced apart radial ribs 72 extending away from the floor of the recess. The spaced apart ribs form separate external compartments 80 within the recess which receive a cooperating locking member (not shown). In this embodiment there are two locking members (not shown) attached at opposite ends of a loop structure such as a belt such that the locking members may be received within the recess by the separate compartments in a locking condition and thereafter the belt may be tightened around the housing in a direction transverse to the ring 13, to help secure the upper and lower body and thereby substantially prevent inadvertent separation of the bodies during operation.

The invention claimed is:

1. A filter device for substantially minimizing moisture and particulate matter in a stream of compressed air or other fluid including:

a housing comprising a first and second body elements, each of the first and second body elements having a closed collar and an open waistband interconnected by a wall, the waistband of each body element having complementary mating components that releasably engage the first and second body elements to form a substantially air/fluid tight internal chamber the first and second body elements include a mounting structure extending from a portion of the respective collar and being centrally located off the chamber;

the first body element including an inlet located in a portion of the collar adjacent the mounting structure for ingress of air/fluid from an air/fluid source into the chamber, and the second body element including an outlet located in a portion of the respective collar adjacent the respective mounting structure for egress of air/fluid from the chamber;

a paper filter mounted within the internal chamber, the paper filter selected from one or more of a conventional toilet roll or a paper roll having a cylindrical open-ended paper/cardboard core, wherein the ends of the cylindrical core of the paper filter are received on at least a portion of the respective mounting structures, the cylindrical core and mounting structures forming a continuous column structure centrally of the chamber, and wherein a circumferential gap is provided between the inlet and the paper filter to initiate movement of incoming pressurized air/fluid stream about the mounting structure; and wherein in an operating condition, air/fluid, which is directed into the chamber under pressure through the inlet, follows a tortuous air/fluid filter pathway around the column structure and through the paper filter towards the outlet substantially increasing moisture filter efficiency and whereby particulate matter becomes trapped in the paper filter or falls under gravity as the air/fluid stream progresses towards the outlet.

2. The filter device in accordance with claim 1 further including, a releasable holding means mountable over the waistband of the body elements for including the body elements together, wherein in operation the housing receives and filters a stream of compressed air at about 60 psi.

3. The filter device in accordance with claim 2 wherein the releasable holding means includes a locking system which assists to maintain the relative positions of the body elements to provide arm air/fluid tight housing.

4. The filter device in accordance with claim 2 wherein the holding means includes a ring member mountable over the waistband of the body elements wherein at least a portion of the waistband of the body elements and the ring member have complementary engagement means allowing engagement to hold the elements together in an air/fluid tight condition.

5. The filter device in accordance with claim 1 wherein the mounting structures are centrally located of respective collars and interconnected thereto by a series of spaced apart radial ribs.

6. The filter device in accordance with claim 5 wherein the radial ribs include a flat portion therealong which in combination form an annular platform for receiving the paper filter in a seated condition spaced from the collar.

7. The filter device in accordance with claim 5 wherein the ribs further include a series of spaced concentric recesses so that a circumferential gap is available between the paper medium and the inlet to urge circular movement of an incoming air/fluid stream.

8. The filter device in accordance with claim 1 wherein the first and second body elements are frustoconical shaped to assist formation of circuitous air/fluid pathway through the filter medium.

9. The filter device in accordance with claim 1 wherein the paper filter can include at least two rolls of conventional toilet tissue such that both body elements house a separate roll and wherein the cylindrical cores are substantially aligned and coterminous to form a longitudinal continuous column structure within the chamber with the respective mounting structures.

10. The filter device in accordance with claim 9 wherein when the waistband of the upper and lower body are joined to form the housing, the at least two rolls undergo compression whereby a portion of the rolls is urged against the wall of the respective body elements and wherein a shallow v-shaped gap in cross-section is formed adjacent the waistband between the wails and the paper medium so as to deflect air/fluid away from the wall and urge cyclonic air/fluid pathway about the column structure.

11. A filter device for use in a spray paint system for substantially minimizing moisture and particulate matter in a stream of compressed air, including:

an air tight housing structure having an internal longitudinal chamber adapted to releasably receive a paper filter medium, the chamber being formed by joining an upper body and a lower body, the upper and lower body each having a collar forming a first and opposite ends of said housing, and a waistband about which the upper and lower bodies are releasably joined in an operating condition;

the upper and lower body include a mounting structure extending inwardly and centrally of the chamber from said ends, wherein a cylindrical core of the paper filter medium is mounted over the mounting structure at each end thereby brining a central longitudinal column structure within the chamber extending from one mounting structure to the opposite mounting structure;

the collar of the lower body having an inlet opening for receiving a stream of compressed air, the inlet opening being located in offset relation from the mounting structure, and the collar of the upper body having an outlet opening for egress of filtered air to a spray gun, the outlet opening being located in offset relation to the respective mounting structure;

wherein at least the mounting structure of the lower body is interconnected to the respective collar by a series of spaced apart radial ribs, the ribs providing a circumferential platform on which the paper filter medium is seated in spaced relation to the inlet opening, and wherein when the paper filter medium is seated on the ribs, the ribs define a series of separate compartments about the mounting structure;

wherein the compartments are in air/fluid communication about the mounting structure such that compressed air entering the inlet opening is directed to flow circumferentially about the mounting structure and between the compartments, and thereafter through the filter medium and about the column structure so as to increase the air path such that moisture from the compressed air is substantially removed without substantially destroying the paper filter medium.

12. The filter device of claim 11, further including a releasable holding mean mountable on or over the waistband of the upper and lower bodies to help maintain the upper and lower bodies of the housing in an air tight condition.

13. The filter device of claim 12 wherein the releasable holding means includes a locking system wherein at least a portion of the waistband of the bodies and the holding means comprise complementary mating components that releasably join/engage the upper and lower bodies.

14. The filter device of claim 11 wherein the upper body and the lower body are frustoconical shaped to assist formation of circuitous air/fluid pathway through the filter medium.

15. The filter device of claim 11 wherein the mounting structure is an annular boss centrally located of the chamber, wherein the boss is interconnected to the collar by a series of spaced apart radial ribs, which form an annular series of compartments about the boss.

16. The filter device of claim 15 wherein the ribs include flat portion, which in combination form a platform for receiving the paper filter medium in a seated condition.

17. The filter device of claim 16 wherein the ribs further include spaced recesses on either side of the flat portion, which provide concentric fluid/air communication between each compartment, and wherein the inlet opening is located adjacent the boss whereby as air/fluid enters the compartment, the spaced recesses allow flow between adjacent compartments and initiates cyclonic air flow.

18. A filter device for substantially minimizing moisture and particulate matter in a stream of compressed air or other fluid including:

a substantially symmetrical housing comprising at least two interconnectable frustoconical body elements, the housing having: an inlet end connectable to a compressed air source and an opposite outlet end for egress of filtered air, the housing including an internal chamber for the passage of compressed air/fluid between the inlet and outlet, and a mounting structure at end portions of the frustoconical body element, the mounting structures extending inwardly from the end portions and being centrally located of the chamber;

a paper filter medium selected from one or more of a conventional toilet roll or a paper roll having a cylindrical open-ended paper cardboard core, wherein in an operating condition, the ends of the cylindrical core of the paper filter medium are received on at least a portion of the mounting structures, wherein the cylindrical core and mounting structures form a continuous column structure centrally of the chamber; and a locking means that releasably interlocks the frustoconical body elements in a substantially air/fluid tight operating condition;

wherein in an operating condition, air/fluid, which is directed into the chamber under pressure through inlet, is urged in a circuitous air/fluid filter pathway around the column structure and through the paper filter medium towards the outlet substantially increasing moisture filter efficiency and whereby particulate matter becomes trapped in the paper filter medium or falls under gravity as the air/fluid stream progresses towards the outlet.

19. The filter device of claim 18 wherein a circumferential gap is provided between at least the inlet end of the housing and the paper filter medium to initiate circuitous movement of incoming pressurized air/fluid stream about the mounting structure.

20. The tilter device of claim 18 wherein the locking means includes complementary mating components that engage with the body elements to substantially maintain the body elements in an air/fluid tight condition during operation of the device.

21. The filter device of claim 18 further including a releasable holding means mountable over the housing for holding the body elements together in a fluid/air tight condition during operation.

22. The filter device of claim 21 wherein the releasable holding means includes a locking system which assists to maintain the relative positions of the body elements to provide an air/fluid tight housing.

23. The filter device of claim 22 wherein the locking system consists of interlocking components that engage with the body elements.

24. The filter device of claim 21 wherein the holding means can include a ring member mountable over the housing wherein at least a portion of the body elements and the ring member have complementary engagement means allowing engagement which causes the ring member to hold the body elements together in an air/fluid tight condition.

25. A filter device in accordance with claim 23 wherein the holding means includes a ring member mountable over the waistband of the body elements wherein at least a portion of the waistband of the body elements and the ring member have complementary engagement means allowing engagement to hold the bodies together in an air/fluid tight condition.

26. The filter device of claim 18 wherein the mounting structure is an annular boss central located of the chamber, wherein the boss is interconnected to the collar housing by a series of spaced apart radial ribs, which form an annular series of compartments about the boss.

* * * * *

UNITED STATES PATENT AND TRADEMARK OFFICE

CERTIFICATE OF CORRECTION

PATENT NO. : 8,425,646 B2
APPLICATION NO. : 12/653828
DATED : April 23, 2013
INVENTOR(S) : S. Gorozidis It is certified that error appears in the above-identified patent and that said Letters Patent is hereby corrected as shown below:

In the Specification

| COLUMN | LINE | ERROR |
|---|---|---|
| 1 | 56 | "pain" should read --paint-- |
| 2 | 34 | "spay" should read --spray-- |
| 2 | 42 | "disintergration" should read --disintegration-- |
| 3 | 13 | "frusto-conical" should read --frustoconical-- |
| 3 | 19 | "frusto-conical" should read --frustoconical-- |
| 3 | 33-34 | "frusto-conical" should read --frustoconical-- |
| 3 | 54 | "frusto-conical" should read --frustoconical-- |
| 3 | 57-58 | "frusto-conical" should read --frustoconical-- |
| 3 | 60-61 | "frusto-conical" should read --frustoconical-- |
| 4 | 21 | "a" should read --an-- |
| 5 | 21 | "a" should read --an-- |
| 5 | 30 | After "recesses of" delete "the" |
| 5 | 31 | "frusto-conical" should read --frustoconical-- |

Signed and Sealed this
Fifteenth Day of April, 2014

Michelle K. Lee

Michelle K. Lee
*Deputy Director of the United States Patent and Trademark Office*

| COLUMN | LINE | ERROR |
|---|---|---|
| 5 | 33 | After “medium” delete “:” and insert --.-- |
| 6 | 22 | “frusto-conical” should read --frustoconical-- |
| 6 | 39-40 | “disintergration” should read --disintegration-- |
| 7 | 22 | “frusto-conical” should read --frustoconical-- |
| 7 | 27 | “potions” should read --portions-- |
| 7 | 58 | “therfrom” should read --therefrom-- |
| 8 | 22 | “The each” should read --Each-- |
| 8 | 33 | “toiled” should read --toilet-- |

In the Claims

| | | |
|---|---|---|
| 9 (Claim 1, | 15 line 13) | “off” should read --of-- |
| 9 (Claim 2, | 45 line 3) | “including” should read --holding-- |
| 9 (Claim 3, | 51 line 4) | “arm” should read --an-- |
| 10 (Claim 10, | 21 line 7) | “wails” should read --walls-- |
| 10 (Claim 11, | 38 line 16) | “brining” should read --forming-- |
| 10 (Claim 12, | 66 line 2) | “mean” should read --means-- |
| 11 (Claim 16, | 17 line 2) | before “flat portion” insert --a-- |
| 11 (Claim 18, | 41 line 16) | “paper cardboard” should read --paper/cardboard-- |

| **COLUMN** | **LINE** | **ERROR** |
|---|---|---|
| 12 (Claim 20, | 14 line 1) | "tilter" should read --filter-- |
| 12 (Claim 26, | 44 line 2) | "central" should read --centrally-- |